United States Patent [19]

Finke-Anlauff

[11] Patent Number: 5,479,476
[45] Date of Patent: Dec. 26, 1995

[54] MOBILE TELEPHONE HAVING GROUPS OF USER ADJUSTABLE OPERATING CHARACTERISTICS FOR FACILITATING ADJUSTMENT OF SEVERAL OPERATING CHARACTERISTICS

[75] Inventor: Andrea Finke-Anlauff, Leiferde, Germany

[73] Assignee: Nokia Mobile Phones Ltd., Salo, Finland

[21] Appl. No.: 191,951

[22] Filed: Feb. 4, 1994

[30] Foreign Application Priority Data

Feb. 9, 1993 [FI] Finland ................................ 930555

[51] Int. Cl.⁶ .................................................. H04Q 7/32
[52] U.S. Cl. .............................. 379/58; 379/59; 379/201; 379/212
[58] Field of Search ........................ 379/58, 59, 157, 379/200, 201, 210–212; 455/186.1

[56] References Cited

U.S. PATENT DOCUMENTS

| | | | |
|---|---|---|---|
| 4,677,653 | 6/1987 | Weiner et al. | 379/59 |
| 4,896,370 | 1/1990 | Kasparian et al. | 379/59 |
| 4,899,373 | 2/1990 | Lee et al. | 379/201 |
| 5,119,413 | 6/1992 | Okomura et al. | 379/157 |
| 5,228,074 | 7/1993 | Mizikovsky | 379/59 |
| 5,243,643 | 9/1993 | Sattar et al. | 379/201 |
| 5,309,502 | 5/1994 | Hirai | 379/58 |
| 5,317,622 | 5/1994 | Shinozaki | 379/58 |

FOREIGN PATENT DOCUMENTS

WO91/12682  8/1991  WIPO.

OTHER PUBLICATIONS

Finnish Office Action dated Oct. 13, 1993 on priority Finnish Application No. 930555.
English translation of Finnish Office Action.

*Primary Examiner*—Dwayne D. Bost
*Attorney, Agent, or Firm*—Perman & Green

[57] ABSTRACT

A mobile telephone has a plurality of user adjustable operating characteristics, such as the volume of an output signal, the ringing volume, and the generation of tones. When moving from one environment to another, such as from an indoor environment to an in-car environment or an out-door environment, it is preferable to modify a plurality of these operating characteristics. In order to facilitate the modification of the plurality of user adjustable characteristics each group includes predetermined values for all these characteristics and the selection of a particular group results in a plurality of characteristics being modified simultaneously. Thus, when moving from one environment to another, a user is only required to make a single menu selection, resulting in a plurality of operating characteristics being modified simultaneously. For example, when moving into an in-car environment, the output volume can be increased, ringing tone volume can be increased and a call transfer function, if previously selected, can be disabled.

15 Claims, 3 Drawing Sheets

| Menu | Indoors | Outdoors | Conference/ theatre | Car | Personal |
|---|---|---|---|---|---|
| Sound volume | 3/5 | 4/5 | 2/5 | 5/5 | 1/5 |
| Ringing tone | intensifying ring | maximum ring | silent | maximum ring | intensifying ring |
| Key tones | off | on | off | on | on |
| Warning tones | on | off | on | on | on |
| Lights | off | off | on | on | off |
| Call transfer | off | off | on | off | off |
| ... | ... | ... | ... | ... | ... |

Fig. 3.

| Menu | Indoors | Outdoors | Conference/ theatre | Car | Personal |
|---|---|---|---|---|---|
| Sound volume | 3/5 | 4/5 | 2/5 | 5/5 | 1/5 |
| Ringing tone | intensifying ring | maximum ring | silent | maximum ring | intensifying ring |
| Key tones | off | on | off | on | on |
| Warning tones | on | off | on | on | on |
| Lights | off | off | on | on | off |
| Call transfer | off | off | on | off | off |
| ... | ... | ... | ... | ... | ... |

MOBILE TELEPHONE HAVING GROUPS OF USER ADJUSTABLE OPERATING CHARACTERISTICS FOR FACILITATING ADJUSTMENT OF SEVERAL OPERATING CHARACTERISTICS

FIELD OF THE INVENTION

The present invention relates to a mobile telephone having a plurality of operating characteristics and means for adjusting said operating characteristics.

BACKGROUND OF THE INVENTION

Mobile telephones tend to have significantly more adjustable characteristics than conventional telephones. For example, known mobile telephones include means for adjusting the sound volume so as to accomodate variations in ambient noise and the operating environment. Thus, when speaking in a car, a higher sound volume is generally used than in, say, a theatre or when in a conference.

Known mobile telephones also make provision for adjusting the ringing volume, again, in accordance with the situation of the user. Outdoors, for example, the ringing volume can be adjusted to its maximum, whereas indoors a lower ringing intensity may be preferred. Furthermore, in a theatre or when in a conference, it may be preferable to switch off the ringer altogether.

In addition to the characteristics which can be controlled over a range of values, mobile telephones are also known which have characteristics which may be switched on or switched off. Examples of these characteristics include whether a tone is heard when a key is pressed, whether warning tones are generated, whether the telephone's lights are switched on and whether calls are automatically transferred, etc.

In known mobile telephones, it is necessary for a user to adjust each individual characteristic when moving from one environment to another such as, for example, when coming out of a meeting or when going outdoors etc. Thus, under these situations, it is necessary for a user to identify each individual characteristic and make suitable adjustments. Usually, this involves selecting characteristics from a menu, adjusting the characteristic selected from the menu and then resetting the telephone to its normal operating mode.

Consequently, it is tedious for an operator to adjust a plurality of characteristics and there is a tendency for characteristics not to be placed into their ideal setting when the telephone is moved from one environment to another. Thus, although the ability to make the appropriate adjustment is provided by the device itself, these adjustments are often not made, resulting in the telephone not offering the best possible performance for each situation within which it is placed.

An object of the present invention is to provide an improved mobile telephone. A further object of the present invention is to facilitate the adjustment of operating characteristics of a mobile telephone.

SUMMARY OF THE INVENTION

According to an aspect of the present invention, there is provided a mobile telephone having a plurality of operating characteristics and means for adjusting said operating characteristics, comprising means for defining a plurality of groups for said characteristics, wherein each group includes predetermined values for said characteristics, and means for selecting one of said defined groups.

Thus, the invention provides an advantage to the effect that, when moving from one environment to another, it is only necessary for a user to select a particular group, in preference to adjusting a plurality of operating characteristics.

The adjustable characteristics may include sound volume, ringing tone, key tones, warning tones, lights, and call transfer or any combination of these characteristics. Groups may include an "indoor" group, an "outdoor" group and an "in-car" group.

In a preferred embodiment, some of the groups will be pre-set and other groups may be defined by a user.

BRIEF DESCRIPTION OF THE DRAWINGS

FIG. 3 shows the relationship between operating characteristics and defined groups.

DETAILED DESCRIPTION OF A PREFERRED EMBODIMENT

Figure 1:
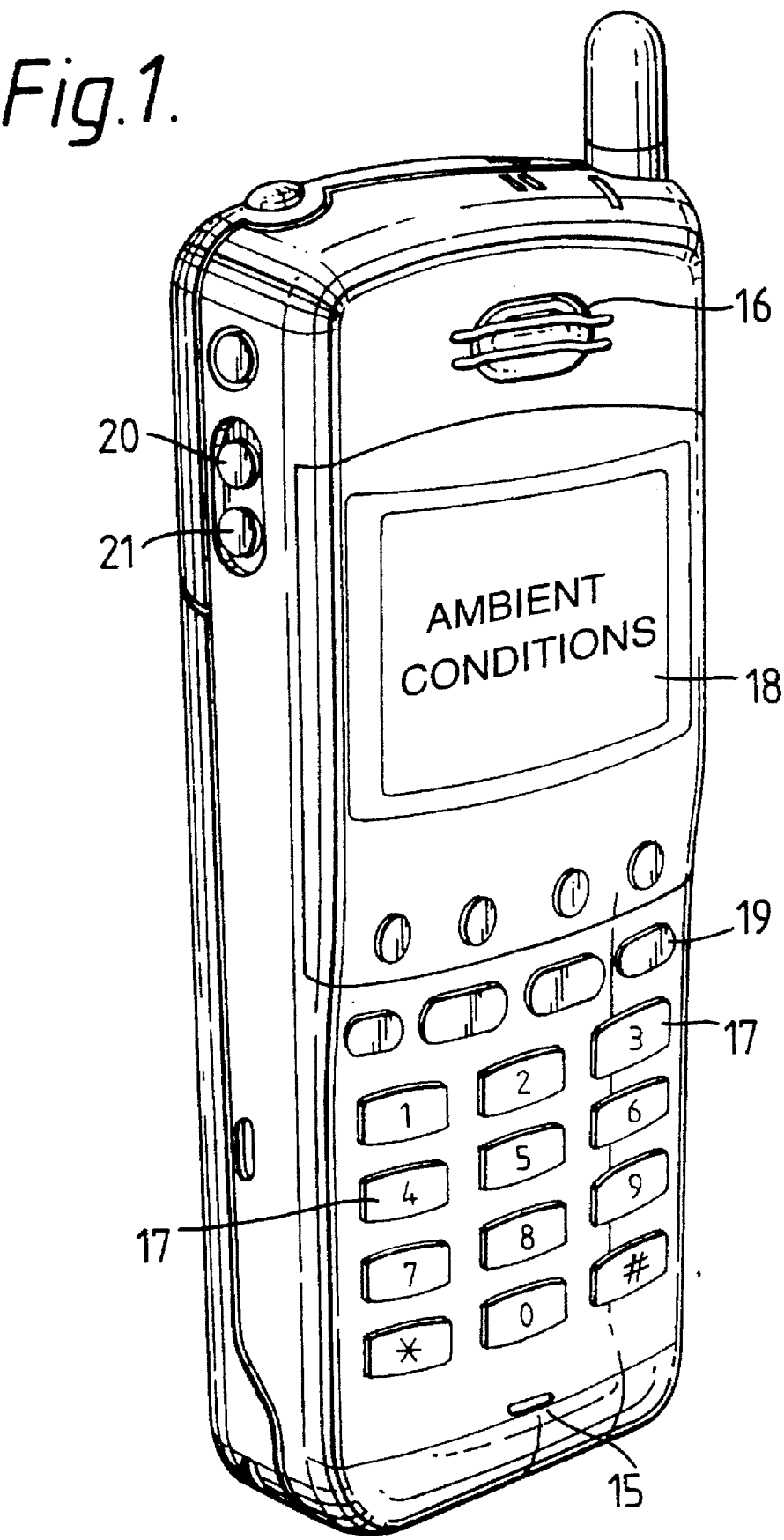
FIG. 1 shows a mobile telephone having an output loudspeaker, an input microphone, a menu display and selection devices.

A mobile telephone is shown in FIG. 1, having a mouthpiece microphone 15 and an earpiece loudspeaker 16. Conventional signalling buttons 17 are provided, enabling telephone numbers to be dialled and for supplementary telephony services to be effected using the star and square buttons. A liquid crystal display 18 also provides a visual display to an operator which, in addition to facilitating conventional telephony operations, also assist the operator in the selection of other operating characteristics.

In operation, an operator may activate a function button 19 which in turn instructs the mobile telephone to display function options on the LCD display 18. These options are displayed in the form of a scrollable menu thus, after operation of button 19, a particular menu function will be displayed on the LCD display 18. This menu selection may, for example, specify the volume of the ringing tone. Thereafter, depression of button 20 will increase the volume of the ringing tone, whereas, depression of button 21 will reduce the volume of the ringing tone.

Further depression of function button 19 will scroll the menu displayed on LCD 18 to the next selectable item. Thus, in similar fashion, the output sound during normal operation may be adjusted, and binary functions may also be adjusted, such as whether tones are generated when keys are pressed, as to whether warning tones are generated, whether the telephone is illuminated and whether calls are automatically transferred etc.

Unlike conventional telephones, which tend to be stationary and are operated, generally, under consistent operating conditions, mobile telephones, by their very nature, are required to telephony services over a wide range of operating conditions. For example, a mobile telephone owner may initially be outdoors walking to an important conference. In both situations, outdoors and while in the conerence, the mobile telephone is required to be active but, due to the change in operating conditions, it is necessary for the telephones operating characteristics to be adjusted. Thus, while outdoors, it is preferable for the output sound through the loudspeaker 16 to be relatively high, so that the user can hear a telephone conversation above background noise. Similarly, it is desirable for the ringing tone to be set at its maximum volume so that the phone can be heard if it rings.

Using a mobile telephone outdoors is more demanding than using the telephone indoors, particularly when confronted with inclement weather conditions. Thus, it is desirable for confirmation to be provided when keys have been pressed and this is achieved by the generation of tones on the depression of each key. Thus, in this way, a user receives confirmation that a key has been pressed, thereby reducing the risk of the key being depressed again. However, it may be unnecessary for the phone to light up while in use outdoors and it would not be necessary for calls to be transferred.

On moving into the meeting, it would be desirable for adjustments to be made to the operating characteristics of the telephone, particularly to ensure that the presence of the telephone does not annoy other people at the meeting. Thus, the user would not wish other people at the meeting to hear the voice of the other caller, therefore it would be desirable for the volume of the output sound to be reduced. Similarly, the volume of the ringing tone may be reduced or, if it would be completely undesirable for calls to be received in this situation, the ringing tone may be switched off altogether. Similarly, it would not be desirable for tones to be produced while keys are depressed, although it may be desirable for warning tones to be generated-such that, for example, an operator is warned if battery replacement is due.

The meeting may be held in subdued lighting, therefore it would be desirable for the telephone to light up when being operated. However, given that the operator is not in a position to receive incoming calls, it will be necessary to effect a call transfer.

Thus, it can be seen that, when moving from an outdoor situation to an indoor meeting situation, it may be necessary to adjust a total of six operating characteristics (and possibly more) in order to achieve maximum benefit from the telephone, while at the same time minimising the intrusive nature of the telephone to other colleagues or delegates.

In addition to a menu selection for each of the individual characteristics, an option provided by the menu device allows a plurality of characteristics to be adjusted by a single operation.

As previously stated, scrollable menus are displayed on the LCD display 18 by operation of the function button 19. Repeated operation of the function button 19 scrolls through the menus and one of said scrollable menus defines ambient conditions, from which a particular ambient condition may be selected. Thus, after operation of the function button 19 such that the menu definition "ambient conditions" is displayed on the LCD display 18, button 20 or button 21 is depressed so as to scroll thru the ambient conditions sub-menu.

The ambient conditions sub-menu has a plurality of functions which include "indoors", "outdoors", "conference/theatre", "car", and "personal". Thus, in the example stated previously, when a user moves from an outdoor ambient condition to a meeting, which may be treated as a conference or a theatre ambient condition it is only necessary for said user to make a single menu selection, from the ambient conditions menu, rather than making independent menu selections from the sound volume menu, the ringing tone menu, the key tones menu, the warning tones menu, the lights menu and the call transfer menu. Thus, when the ambient conditions menu is set to outdoors, the sound volume will be set to four fifths of its maximum, the ringing tone will be set to its maximum value, key tones will be on, warning tones will be off, lights will be off and the call transfer function will be off. On entering the meeting, an operator selects the ambient conditions menu and from this menu selects the conference/theatre option. On selecting this option, the sound volume is automatically adjusted to two fifths of its maximum, the ringing tone is switched off, key tones are switched off, warning tones are switched on, the lighting function is switched on and call transfer is switched on.

Figure 2:
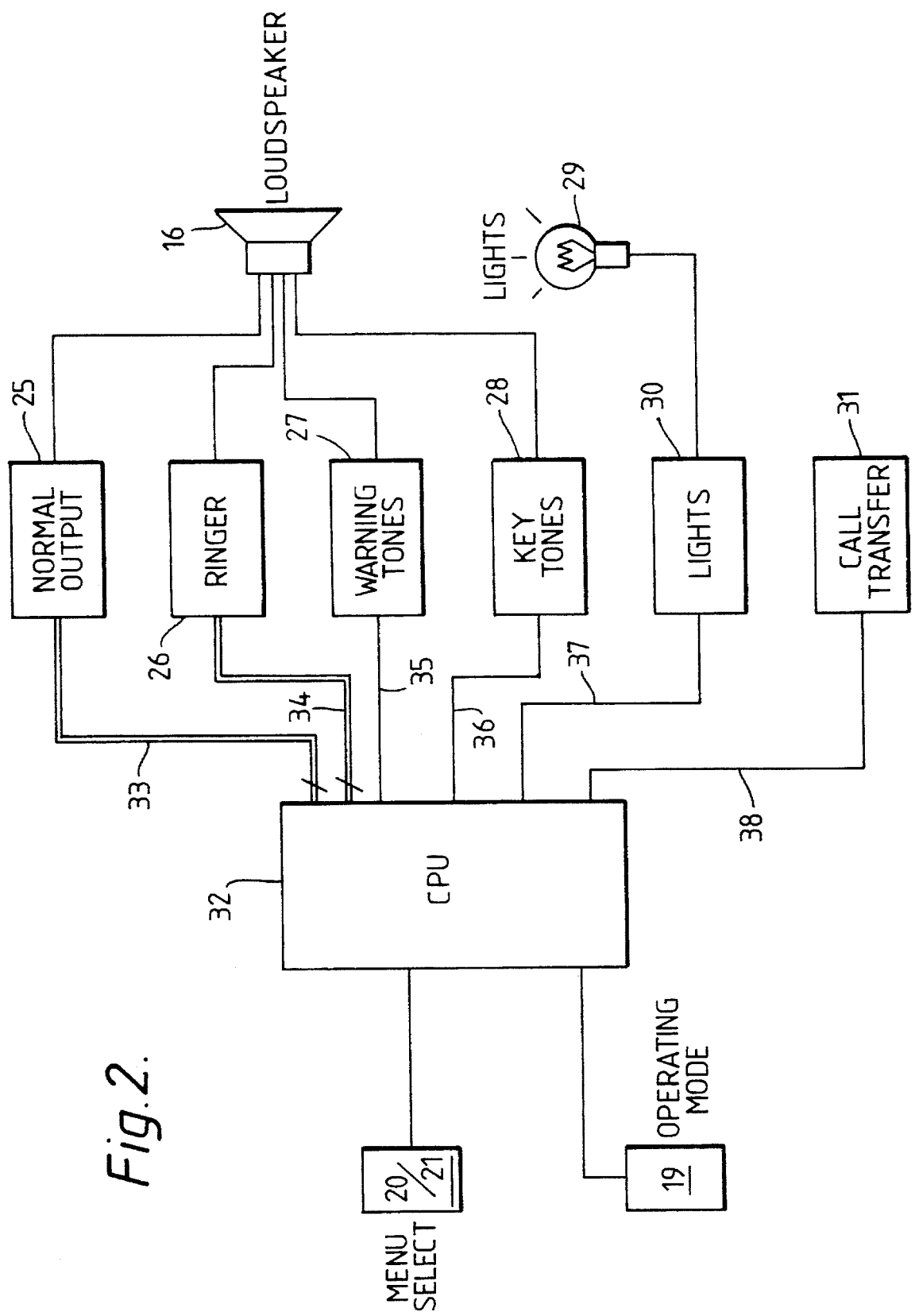
FIG. 2 schematically represents a loudspeaker and menu selection devices of the telephone shown in FIG. 1, connected to a processing device arranged to define groups of operating characteristics and to control operating characteristics in response to group selections.

A schematic representation of the processing devices within the telephone of FIG. 1 are shown in FIG. 2. The loudspeaker 16 is relevant to four of the functions in which output sounds are generated. Normal output speech is supplied to the loudspeaker 16 via an output circuit 25. Ringing tones are generated by a tone generation circuit 26, warning tones are generated by a tone generation circuit 27 and key tones, produced when keys are depressed, are generated by a key tone generation circuit 28. However, it should be appreciated that FIG. 2 is a schematic representation and that in alternative embodiments a single tone generating circuit may be provided capable, on command, of producing a plurality of tones.

When the light option is selected, the first depression of a key results in the control panel being illuminated by a light source 29, receiving power from a light control circuit 30. Similarly, when selected, a call transfer circuit 31 effects the transfer of calls to a predetermined telephone number. Again, the call transfer feature 31 is shown schematically in FIG. 2 and, in an alternative embodiment, could be effected by program control of a central processing unit.

Central processing unit 32 is provided which, amongst other things, provides enabling signals over enabling lines 33 to 38 to respective devices 25 to 31.

The operation of button 19 is illustrated in FIG. 2 by "operating mode selection" 19. Thus, repeated operation of the operating mode selection button 19 results in the CPU 32 effectively scrolling through a plurality of menu options, displayed on the LCD display 18 shown in FIG. 1. Thus, repeated operation of the operating mode selection button 19 will result in the ambient conditions selection being made and an indication of this being displayed on the LCD display 18. Thereafter, selection of a particular ambient condition is made by operation of buttons 20 and 21, resulting in the selected ambient condition being displayed on the LCD display 18.

In response to a particular ambient condition being selected, the CPU 32 is programmed to supply appropriate enabling signals to devices 25 to 31. The enabling signal supplied to the volume control circuit 25 includes a plurality of bits, thereby defining the output volume for said device. Similarly, a plurality of bits are provided to the ringing control circuit 25. Circuits 27 to 31 receive a single bit, arranged to enable said devices or disable said devices in a binary fashion.

Thus, referring to the previously described example, a menu selection for "outdoors" may be made, which results in a signal being supplied to the volume control circuit 25, controlling said circuit such that the output volume is set to four fifths of its maximum. Similarly, a signal is supplied to the ringing circuit 26, ensuring that said ringing circuit produces ringing tones of maximum volume when supplied to the loudspeaker 16. The warning tone circuit 27 is disabled but the key tone circuit 28 is enabled. The light circuit 30 is disabled and the call transfer circuit 31 is disabled.

The full range of ambient conditions selectable from the ambient conditions menu is shown in FIG. 3. Presented in the upper row of the Figure are various situations 41 which may be selected. These are "indoors", "outdoors", "conference", "theatre" and "car". The characteristics set by the selection of an ambient condition are presented in the left column of the Figure. As shown, these settings are for output sound volume, ringing volume, key tones, warning tones, lights and call transfer.

On selecting the ambient conditions menu, operation of buttons 20 and 21 results in the ambient condition selections 42 to 47 being displayed on the LCD display 18. When a particular selection is made, by operation of the function button 19, the operating characteristics specified above are set as detailed in FIG. 3.

Thus, when the "indoors" option is selected from the ambient conditions menu, the output sound volume is set to three fifths of its maximum value and the ringing tone is set such that said tone is initiated at a low volume with a steadily increasing volume which ramps up while the call remains unanswered. The key tones option is set to its off position, such that tones are not generated while keys are depressed. The warning tones option is set to its on position, such that, where appropriate, audible warning tones are generated. The lights option is set to its off position, such that the telephone's internal light source 29 is not activated. The call transfer option is set to its off position, thereby ensuring that calls are not transferred when a call is made to the telephone.

When the "outdoors" option is selected from the ambient conditions menu, the output sound volume is set to four fifths of its maximum value. Ringing tone is also adjusted so that, at all times, the output volume is at its maximum. The key tones option is switched on, such that tones are generated when keys are depressed but the warning tones option is switched off. Similarly, the lights option is switched off and the call transfer option is switched off.

On selecting the "conference/theatre" option, the output sound volume is set to two fifths of its maximum value and the ringing tone output volume level is disabled, such that no output ringing tone is generated. The key tones option is switched off but the warning tones option is switched on. The lights option is switched on and the call transfer option is switched on, resulting in all incoming calls being transferred to another telephone number.

When the "in-car" option is selected, the output volume level is set to its maximum value and the ringing tone level is also set to its maximum value. Key tones are generated when keys are depressed and warning tones, where appropriate are generated. The telephone is illuminated on the depression of a key, by the selection of the lights option and the call transfer option is switched off.

In this embodiment, options 43 to 46 are predefined during manufacturing but additional options are provided which are programmable by a user. Thus, selection 47, identified as "personal" is completely programmable by an operator. In the example, the operator has selected options such that the output sound volume is set to one fifth of its maximum level. The ringing tone is set to the intensifying ramping option and the key tones option is set to on. The warning tones option is also set to on, but the lights option is set to off and the call transfer option is off.

Thus, as can be appreciated, when the ambient conditions change, a user is only required to select a particular grouping 43 to 47 representing an ambient condition applicable to the particular situation. When an ambient condition is selected, all of the appropriate characteristics are adjusted.

In an alternative embodiment, ambient conditions are pre-programmed during manufacturing however, these pre-programmed values are adjustable by an operator from the "factory-set" position. Thus, a user may be able to define his own grouping of characteristics for a particular ambient condition or modify an original factory-set grouping.

If the telephone is used by more than one person, each person may have their own "personal" settings which will be appropriate to the particular use being made by that user.

What I claim is:

1. A mobile telephone having a plurality of user adjustable operating characteristics and means for adjusting said operating characteristics, comprising means for defining a plurality of groups of said operating characteristics, wherein each said group includes a plurality of said user adjustable operating characteristics, and means for selecting one of said defined plurality of groups for controlling an operation of said mobile telephone at least partially in accordance with the user adjustable characteristics of the selected one of said groups.

2. A mobile telephone according to claim 1, and further including ringing means, wherein the volume of said ringing means is one of said user adjustable operating characteristics.

3. A mobile telephone according to claim 1, and further including output means, wherein the volume of a signal generated by said output means is one of said user adjustable operating characteristics.

4. A mobile telephone according to claim 1, and further including means for generating tones when keys are depressed, wherein the generation of key tones is one of said user adjustable operating characteristics.

5. A mobile telephone according to claim 1, and further including means for generating warning tones, wherein the generation of warning tones is one of said user adjustable operating characteristics.

6. A mobile telephone according to claim 1, and further including means for illuminating said telephone, wherein said telephone illumination is one of said user adjustable operating characteristics.

7. A mobile telephone according to claim 1, and further including means for transferring calls, wherein the transfer of calls is one of said user adjustable operating characteristics.

8. A mobile phone according to claim 1, wherein values of the operating characteristics of at least one of said groups are adjustable by the user.

9. A method for modifying user adjustable operating characteristics of a mobile telephone having a plurality of operating characteristics, comprising the steps of:

defining a plurality of groups each of which includes a plurality of said user adjustable characteristics, inputting values for individual ones of said plurality of user adjustable characteristics and, selecting one of said defined groups for use in controlling an operation of the mobile telephone at least partially in accordance with the inputted values of the selected one of the groups.

10. A method according to claim 9, wherein the step of inputting values for said characteristics of a group is performed by a user.

11. A method according to claim 9, wherein groups are predetermined for situations including "indoors", "outdoors" and "in-car".

12. A method according to claim 9, wherein the step of selecting is done from a displayed menu.

13. A method according to claim 9 and further comprising a step of changing the values of said characteristics of said groups by the user.

14. A method according to claim 9, wherein the steps of defining and inputting are performed during the manufacturing process.

15. A method according to claim 14 and further comprising a step of changing the values of said characteristics of said groups by the user.

* * * * *

EX PARTE REEXAMINATION CERTIFICATE (8939th)
United States Patent
Finke-Anlauff

(10) Number: US 5,479,476 C1
(45) Certificate Issued: Apr. 3, 2012

(54) MOBILE TELEPHONE HAVING GROUPS OF USER ADJUSTABLE OPERATING CHARACTERISTICS FOR FACILITATING ADJUSTMENT OF SEVERAL OPERATING CHARACTERISTICS

(75) Inventor: Andrea Finke-Anlauff, Leiferde (DE)

(73) Assignee: Mobilemedia Ideas LLC, Chevy Chase, MD (US)

Reexamination Request:
No. 90/009,943, Aug. 24, 2011

Reexamination Certificate for:
Patent No.: 5,479,476
Issued: Dec. 26, 1995
Appl. No.: 08/191,951
Filed: Feb. 4, 1994

(30) Foreign Application Priority Data

Feb. 9, 1993 (FI) .................................................. 930555

(51) Int. Cl.
*H04M 1/725* (2006.01)
*H04M 19/00* (2006.01)
*H04M 1/72* (2006.01)
*H04M 19/04* (2006.01)
*H04M 1/60* (2006.01)

(52) U.S. Cl. ........................................ 455/566; 455/418
(58) Field of Classification Search .................. None
See application file for complete search history.

(56) References Cited

To view the complete listing of prior art documents cited during the proceeding for Reexamination Control Number 90/009,943, please refer to the USPTO's public Patent Application Information Retrieval (PAIR) system under the Display References tab.

*Primary Examiner* — Roland Foster

(57) ABSTRACT

A mobile telephone has a plurality of user adjustable operating characteristics, such as the volume of an output signal, the ringing volume, and the generation of tones. When moving from one environment to another, such as from an indoor environment to an in-car environment or an out-door environment, it is preferable to modify a plurality of these operating characteristics. In order to facilitate the modification of the plurality of user adjustable characteristics each group includes predetermined values for all these characteristics and the selection of a particular group results in a plurality of characteristics being modified simultaneously. Thus, when moving from one environment to another, a user is only required to make a single menu selection, resulting in a plurality of operating characteristics being modified simultaneously. For example, when moving into an in-car environment, the output volume can be increased, ringing tone volume can be increased and a call transfer function, if previously selected, can be disabled.

| Menu | Indoors | Outdoors | Conference/theatre | Car | Personal |
|---|---|---|---|---|---|
| Sound volume | 3/5 | 4/5 | 2/5 | 5/5 | 1/5 |
| Ringing tone | intensifying ring | maximum ring | silent | maximum ring | intensifying ring |
| Key tones | off | on | off | on | on |
| Warning tones | on | off | on | on | on |
| Lights | off | off | on | on | off |
| Call transfer | off | off | on | off | off |
| ... | ... | ... | ... | ... | ... |

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2 and 8 is confirmed.

Claim 9 is cancelled.

Claims 10 and 12-14 are determined to be patentable as amended.

Claim 15 dependent on an amended claim, is determined to be patentable.

New claims 16-24 are added and determined to be patentable.

Claims 3-7 and 11 were not reexamined.

10. A method according to claim [9] *12*, wherein the step of inputting values for said characteristics of a group is performed by a user.

11. A method [according to claim 9] *for modifying user adjustable operating characteristics of a mobile telephone having a plurality of operating characteristics, comprising the steps of:*

*defining a plurality of groups each of which includes a plurality of said user adjustable characteristics,*

*inputting values for individual ones of said plurality of user adjustable characteristics and,*

*selecting one of said defined groups for use in controlling an operation of the mobile telephone at least partially in accordance with the inputted values of the selected one of the groups,* wherein groups are predetermined for situations including "indoors", "outdoors" and "in-car".

12. A method [according to claim 9] *for modifying user adjustable operating characteristics of a mobile telephone having a plurality of operating characteristics, comprising the steps of:*

*defining a plurality of groups each of which includes a plurality of said user adjustable characteristics,*

*inputting values for individual ones of said plurality of user adjustable characteristics and,*

*selecting one of said defined groups for use in controlling an operation of the mobile telephone at least partially in accordance with the inputted values of the selected one of the groups,* wherein the step of selecting is done from a displayed menu.

13. A method according to claim [9] *12*, and further comprising a step of changing the values of said characteristics of said groups by the user.

14. A method according to claim [9] *12*, wherein the steps of defining and inputting are performed during the manufacturing process.

*16. The mobile telephone of claim 1 further comprising:*

*a display for displaying information,*

*wherein said means for selecting is for displaying on said display a first indication of a ringtone volume setting and a second indication of an illumination setting of a light source of said mobile telephone, in response to user input.*

*17. The mobile phone of claim 1 further comprising:*

*a tone generation circuit;*

*a loudspeaker connected to said tone generation circuit; and*

*a light source,*

*wherein one of said groups comprises first and second user adjustable operating characteristics, wherein said first user adjustable operating characteristics includes a setting that controls a ringing sound produced by said loudspeaker and wherein said second user adjustable operating characteristic includes a setting that controls light generated by said light source.*

*18. The mobile telephone of claim 1, wherein said means for defining is for defining at least one manufacturing pre-programmed group of user adjustable operating characteristics and at least one user-defined group of user adjustable operating characteristics set by a user of the mobile telephone.*

*19. The mobile telephone of claim 18 wherein said means for defining is for defining a second manufacturing pre-programmed group of user adjustable operating characteristics and a second user-defined group of user adjustable operating characteristics set by a user of the mobile telephone.*

*20. The method of claim 12 further comprising:*

*displaying on a display of said mobile telephone indications of each group of said defined plurality of groups of operating characteristics in response to user input.*

*21. The method of claim 20 further comprising:*

*displaying on said display a first indication of a ringtone volume setting and a second indication of an illumination setting of a light source of said mobile telephone, in response to user input.*

*22. The method of claim 12 wherein one of said groups comprises first and second user adjustable operating characteristics, wherein said first user adjustable operating characteristics includes a setting that controls a ringing sound produced by a loudspeaker connected to a tone generation circuit of said mobile telephone and wherein said second user adjustable operating characteristic includes a setting that controls light generated by a light source of said mobile telephone.*

*23. The method of claim 12, wherein said defining step further comprises:*

*defining at least one manufacturing pre-programmed group of user adjustable operating characteristics and at least one user-defined group of user adjustable operating characteristics set by a user of said mobile telephone.*

*24. The method of claim 23 wherein said defining step further comprises:*

*defining a second manufacturing pre-programmed group of user adjustable operating characteristics and a second user-defined group of user adjustable operating characteristics set by a user of said mobile telephone.*

\* \* \* \* \*

US005479476C2

(12) EX PARTE REEXAMINATION CERTIFICATE (10180th)
United States Patent
Finke-Anlauff

(10) Number: US 5,479,476 C2
(45) Certificate Issued: May 30, 2014

(54) MOBILE TELEPHONE HAVING GROUPS OF USER ADJUSTABLE OPERATING CHARACTERISTICS FOR FACILITATING ADJUSTMENT OF SEVERAL OPERATING CHARACTERISTICS

(75) Inventor: Andrea Finke-Anlauff, Leiferde (DE)

(73) Assignee: Mobilemedia Ideas LLC, Chevy Chase, MD (US)

Reexamination Request:
No. 90/012,652, Sep. 14, 2012

Reexamination Certificate for:
Patent No.: 5,479,476
Issued: Dec. 26, 1995
Appl. No.: 08/191,951
Filed: Feb. 4, 1994

Reexamination Certificate C1 5,479,476 issued Apr. 3, 2012

(30) Foreign Application Priority Data

Feb. 9, 1993 (FI) .......................................... 930555

(51) Int. Cl.
*H04M 1/725* (2006.01)
*H04M 19/00* (2006.01)
*H04M 1/72* (2006.01)
*H04M 19/04* (2006.01)
*H04M 1/60* (2006.01)

(52) U.S. Cl.
USPC .......................................... 455/566; 455/418

(58) Field of Classification Search
None
See application file for complete search history.

(56) References Cited

To view the complete listing of prior art documents cited during the proceeding for Reexamination Control Number 90/012,652, please refer to the USPTO's public Patent Application Information Retrieval (PAIR) system under the Display References tab.

*Primary Examiner* — Colin Larose

(57) ABSTRACT

A mobile telephone has a plurality of user adjustable operating characteristics, such as the volume of an output signal, the ringing volume, and the generation of tones. When moving from one environment to another, such as from an indoor environment to an in-car environment or an out-door environment, it is preferable to modify a plurality of these operating characteristics. In order to facilitate the modification of the plurality of user adjustable characteristics each group includes predetermined values for all these characteristics and the selection of a particular group results in a plurality of characteristics being modified simultaneously. Thus, when moving from one environment to another, a user is only required to make a single menu selection, resulting in a plurality of operating characteristics being modified simultaneously. For example, when moving into an in-car environment, the output volume can he increased, ringing tone volume can be increased and a call transfer function, if previously selected, can be disabled.

| Menu | Indoors | Outdoors | Conference/theatre | Car | Personal |
|---|---|---|---|---|---|
| Sound volume | 3/5 | 4/5 | 2/5 | 5/5 | 1/5 |
| Ringing tone | intensifying ring | maximum ring | silent | maximum ring | intensifying ring |
| Key tones | off | on | off | on | on |
| Warning tones | on | off | on | on | on |
| Lights | off | off | on | on | off |
| Call transfer | off | off | on | off | off |
| ... | ... | ... | ... | ... | ... |

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 9 was previously cancelled.
Claims 10, 12-15 and 20-24 are cancelled.
Claims 1-8, 11 and 16-19 were not reexamined.

* * * * *